US007422146B2

(12) United States Patent
Dennett (10) Patent No.: US 7,422,146 B2
(45) Date of Patent: Sep. 9, 2008

(54) METHOD AND APPARATUS FOR PROMOTION OF TRANSACTION CARD

(76) Inventor: Douglas Dennett, 17811 Comstock Rd., Wayzata, MN (US) 55391

( * ) Notice: Subject to any disclaimer, the term of this patent is extended or adjusted under 35 U.S.C. 154(b) by 324 days.

(21) Appl. No.: 11/365,354

(22) Filed: Mar. 1, 2006

(65) Prior Publication Data

US 2007/0205267 A1 Sep. 6, 2007

(51) Int. Cl.
*G06K 5/00* (2006.01)
(52) U.S. Cl. .................. 235/380; 235/381; 235/487; 705/14
(58) Field of Classification Search ............. 235/380, 235/375, 383, 381, 487, 492; 705/14
See application file for complete search history.

(56) References Cited

U.S. PATENT DOCUMENTS

| 1,803,234 | A | 4/1931 | Clark |
| 1,850,369 | A | 3/1932 | Andrews |
| 2,131,448 | A | 9/1938 | Lowen .................... 40/125 |
| 3,424,636 | A | 1/1969 | Brody ..................... 156/201 |
| 3,628,266 | A | 12/1971 | Wise et al. ................. 40/10 |
| 3,921,319 | A | 11/1975 | Styers et al. ................ 40/10 |
| 4,305,216 | A | 12/1981 | Skelton .................... 40/10 |
| 4,551,373 | A | 11/1985 | Conlon .................... 428/43 |
| 4,846,504 | A | 7/1989 | MacGregor et al. ........ 283/102 |
| 5,141,252 | A | 8/1992 | Michlin ................... 281/15.1 |
| 5,784,816 | A | 7/1998 | Zapawa .................. 40/654.01 |
| 5,967,557 | A | 10/1999 | Dahlquist ................. 283/56 |
| 5,992,892 | A | 11/1999 | Schaefer et al. ........... 283/901 |
| 6,068,903 | A | 5/2000 | Volkert .................... 428/40.1 |
| 6,248,377 | B1 | 6/2001 | Levine ..................... 426/87 |
| 6,508,900 | B1 | 1/2003 | Kendall et al. ............. 156/226 |
| 6,543,162 | B1 | 4/2003 | Niedfeld .................. 40/124.06 |
| 6,547,914 | B2 | 4/2003 | Schnitzer et al. .......... 156/250 |
| 7,011,249 | B2 * | 3/2006 | Tang ...................... 235/486 |
| 7,222,797 | B2 * | 5/2007 | Davila et al. ............... 235/487 |
| 2001/0023895 | A1 * | 9/2001 | Kubert et al. .............. 235/487 |
| 2002/0100797 | A1 | 8/2002 | Hollingsworth et al. ..... 229/92.8 |
| 2004/0151862 | A1 * | 8/2004 | Molcho et al. ............. 428/41.7 |
| 2004/0187368 | A1 | 9/2004 | Foster .................... 40/124.06 |
| 2006/0154012 | A1 * | 7/2006 | Ashton et al. ............. 428/40.1 |
| 2007/0017973 | A1 * | 1/2007 | Blank et al. ............... 235/380 |

* cited by examiner

*Primary Examiner*—Thien M. Le
*Assistant Examiner*—Edwyn Labaze
(74) *Attorney, Agent, or Firm*—Thomas J. Nikolai; Nikolai & Mersereau, P.A.

(57) ABSTRACT

An envelope for carrying a transaction card is provided. A transaction card is a gift certificate or the like redeemable for additional goods from a retail store or the like. The envelope includes a planar surface having a first side and a second side. A slot is cut into the planar surface and an adhesive is superimposed on the second side of the planar surface. When the envelope is affixed to an object, a pocket forms between the planar surface and the object. The object is in communication with the slot. The transaction card can then be inserted into the slot to securely dispose the transaction card in the envelope. The envelope further includes a concealed promotional material assembly for advancing promotion of the retail store. The concealed promotional material assembly includes promotional material such as a coupon, a scratch-off game, or a scratch-and-sniff sheet, a label concealing the promotional material and an adhesive removably securing the label concealing the promotional material. The label is a single thickness opaque sheet with a front side and an underside and variable indicia written on at least one side of the opaque sheet.

58 Claims, 6 Drawing Sheets

METHOD AND APPARATUS FOR PROMOTION OF TRANSACTION CARD

FIELD OF THE INVENTION

The present invention relates to an envelope supporting a transaction card.

BACKGROUND OF THE INVENTION

Gift giving and receiving is an important activity in a person's life. People like to give gifts to celebrate special occasions, show appreciation and affection for another, and, in some calculating circumstance, to promote consumption of goods and services. Wedding gifts, birthday gifts, holiday gifts and anniversary gifts are all commonly given gifts. However, the practice of gift giving raises the eternal question of "what do you get for the person that has everything?"

In recent years, gift certificates and transaction cards have become the gift of choice for people who lack the time or creativity to invest the effort to get the "perfect gift." Typically, transaction cards are debit cards having a magnetic stripe that encodes a monetary credit amount that can be read by an appropriate card reader. These gift cards are typically in the shape and size of the typical credit card. These transaction cards may be used as a gift certificate or prepaid credit for purchase of merchandise at a retail establishment. The retail establishment will typically be identified on the face of the transaction card.

However, some consider a gift card, by itself, to be a generic, and not entirely thoughtful gift. Therefore, a need exists for a fully-integrated gift giving experience. Here, the gift card may complement or supplement an actual gift. For example, one could purchase a DVD player for another and, in addition, give a transaction card good for purchasing DVDs to watch on the DVD player. This allows the gift giver to add his or her personal touch to the gift.

Integrated gift giving will also provide retail stores with marketing opportunities that heretofore have gone untapped. As previously mentioned, retailers will often identify themselves, by their logo, on the face of the transaction card. This is a very passive means of advertising the retailer's establishment. There is a need for actively promoting a retail establishment in combination with the giving of gift cards.

Manufacturers and retailers often use promotional coupons to actively promote their businesses or establishments. A need exists to integrate these active promotional materials with the transaction card so that gift givers can give the transaction card as a gift, while at the same time actively promoting the retailer's business.

The goal of the present invention is to provide an envelope supporting a transaction card which can actively promote the goods and services of a manufacturer, retailer or service provider or the like.

SUMMARY OF THE INVENTION

In accordance with the broad aspect of the invention, a self-adhesive envelope for delivery of a transaction card is provided. The envelope also has a space for displaying promotional information about a retailer or manufacturer. The envelope comprises a planar surface having a first and second side. A slit is cut into the planar surface. An adhesive is superimposed on the second side of the planar surface so that the envelope may be adhesively affixed to an object such as a box or book. A pocket is formed between the planar surface and the object that the planar surface is affixed to. The pocket is accessible through the slit to removably insert a transaction card therein.

The present invention also includes a concealed promotional material assembly comprising a label, promotional material and an adhesive to couple the label to the promotional material so as to conceal the promotional material. The label is typically an opaque sheet sized to substantially cover the promotional material. The opaque sheet will have a front side and an underside, wherein the underside is in communication with the promotional material to conceal said promotional material. Variable indicia can be placed on either side of the label to provide an additional medium for promoting the goods and services of manufacturer or retail store. Furthermore, the label may have a pivoting end and a free end where the pivoting end is affixed to the planar surface so that the label may pivot to cover or reveal the promotional material rather than be peeled off entirely.

The promotional material may be a coupon, a scratch-off game or a scratch-and-sniff surface. The coupon may be a money-off coupon for use in purchasing additional products. The scratch-off game piece may be used to introduce new products, or for other promotional purposes. Likewise, the scratch-and-sniff surface may provide olfactory information corresponding to the goods provided by the retailer, such as a grocery store.

These elements are combined to form an improved envelope for delivery of a transaction card. For example, an electronics retailer may provide a transaction card for sale. A customer could purchase from the electronics retailer both a DVD player and a transaction card good for purchasing DVDs to show on the DVD player. The transaction card will come with the envelope of the present invention and the customer will affix the envelope to the box containing the DVD player and insert the transaction card into this pocket formed between the envelope and the box and insert the transaction card into the slit provided. The customer then gives both the DVD player as well as the transaction card to the gift receiver. When the gift receiver is ready to take the transaction card to the retailer in order to purchase the DVDs, he will notice that the concealed promotion material assembly is on the face of the envelope. He will then pull back the label of the concealed promotion material assembly to reveal the promotional material which he or she may use to obtain further bargains from the retailer.

BRIEF DESCRIPTION OF THE DRAWINGS

In the drawings, wherein like numerals depict like parts throughout the same.

DETAILED DESCRIPTION OF THE PREFERRED EMBODIMENTS

Figure 1:
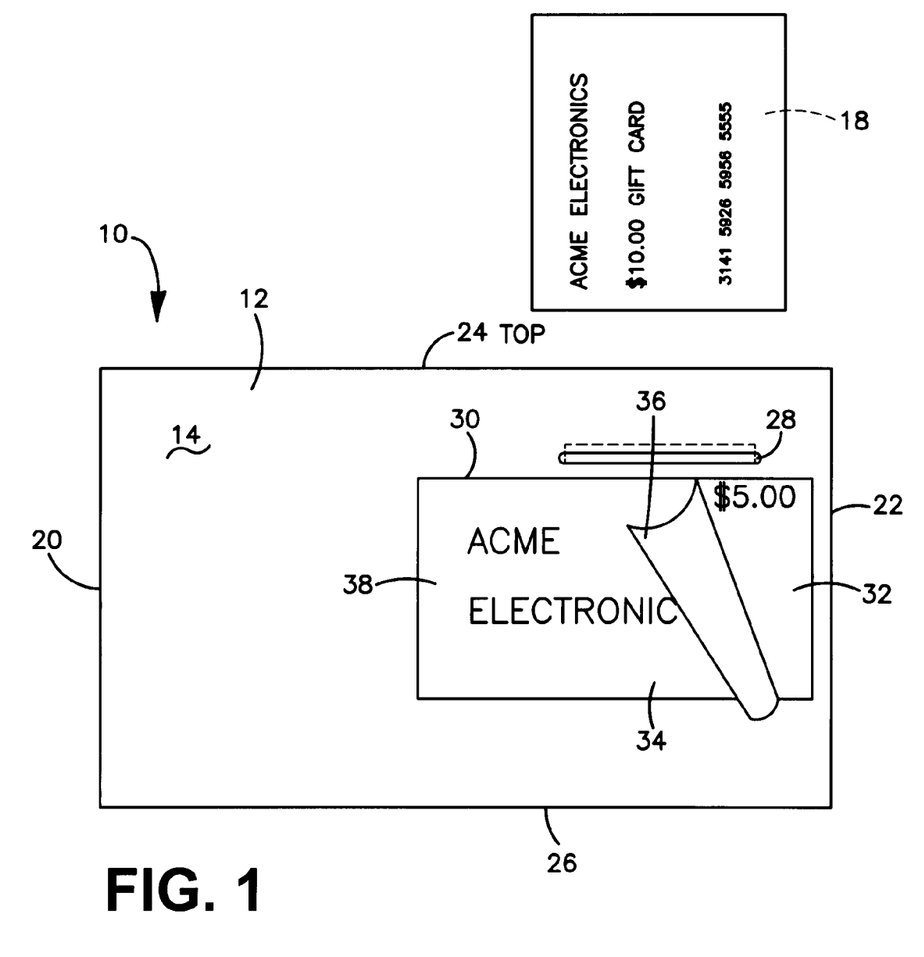
FIG. 1 depicts a front view of a transaction card envelope in accordance with the embodiment of the present invention.

FIG. 1 shows a front view of a transaction card envelope 10 in accordance with the embodiment of the present invention.

Figure 2:
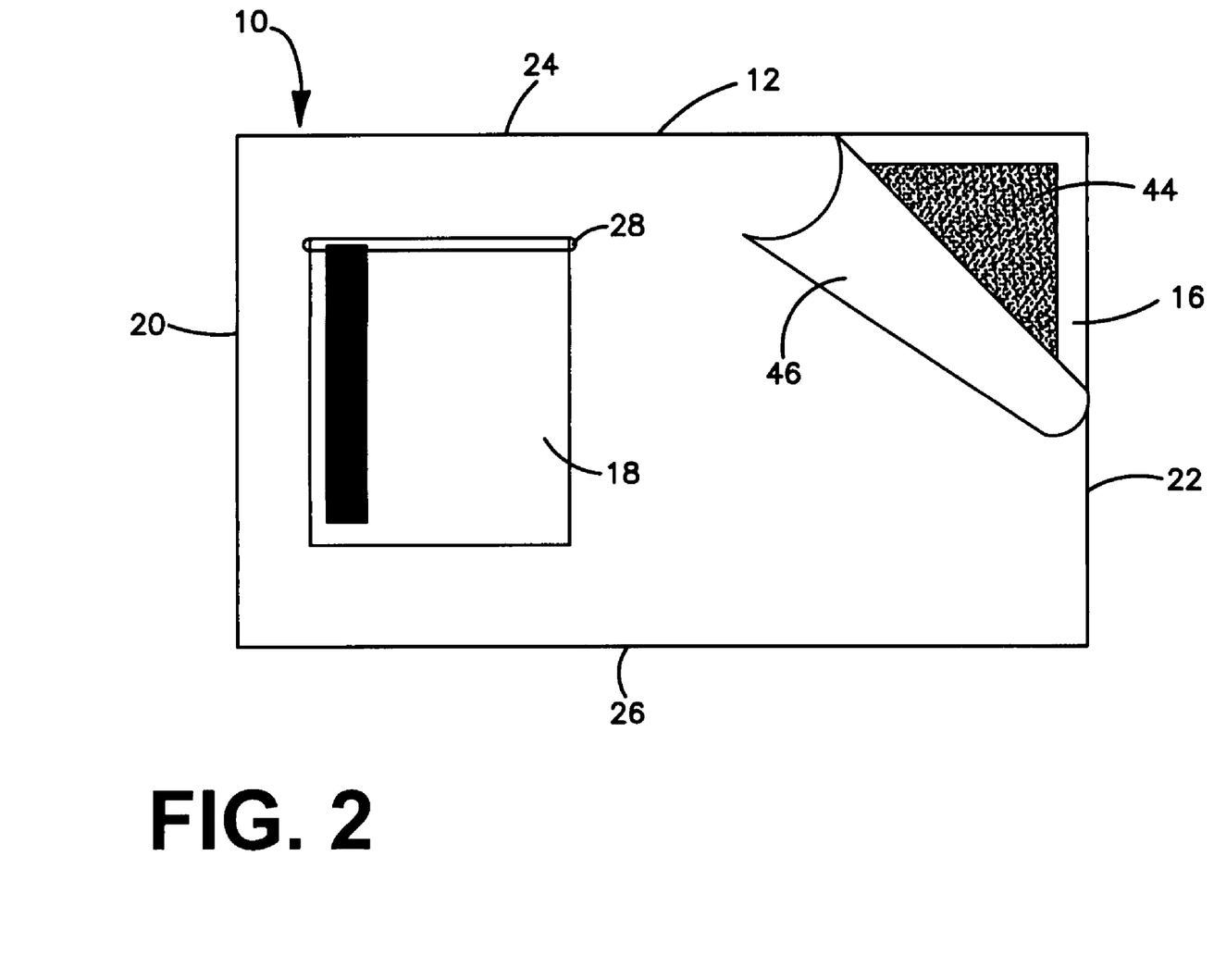
FIG. 2 is a rear view of the envelope shown in FIG. 1.
Figure 3:
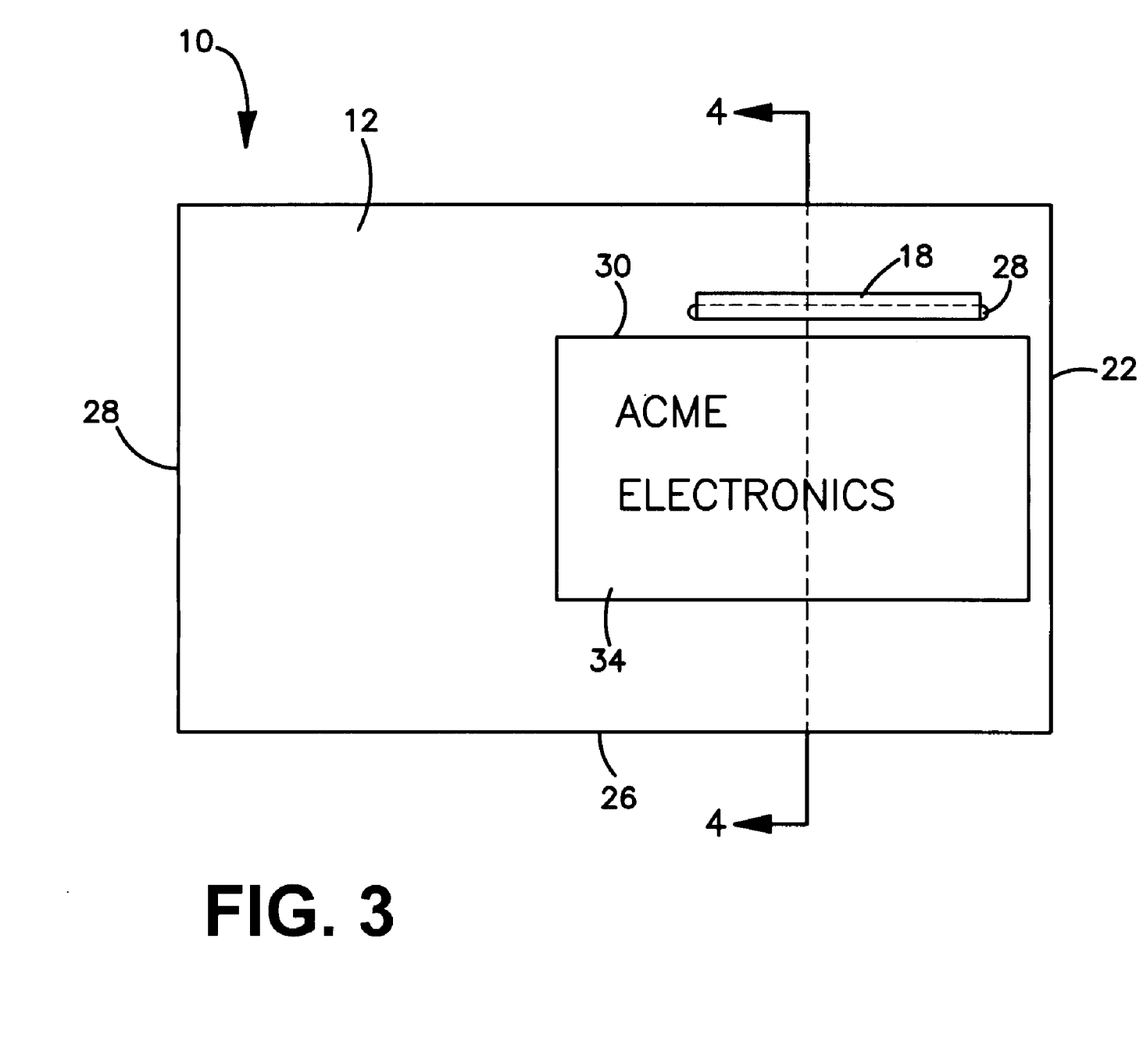
FIG. 3 is a front view of the envelope shown in FIG. 1 wherein a transaction card is inserted into the slot for retaining the transaction card.

The envelope comprises a planar surface 12 having a first side 14 and a second side 16 (shown in FIG. 2). The planar surface 12 must generally be made of a substance sturdy enough to protect a transaction card 18 from falling out while at the same time adhering itself to an object, such as a box, book or the like. The planar surface 12 has a first end 20, a second end 22 which are connected together by a top line 24 and a bottom line 26.

The planar surface 12 of the envelope 10 has a slot member 28 cut through the planar surface 12 for insertion of the transaction card 18 between rear surface 16 and the object to which envelope 10 is affixed.

Figure 5:
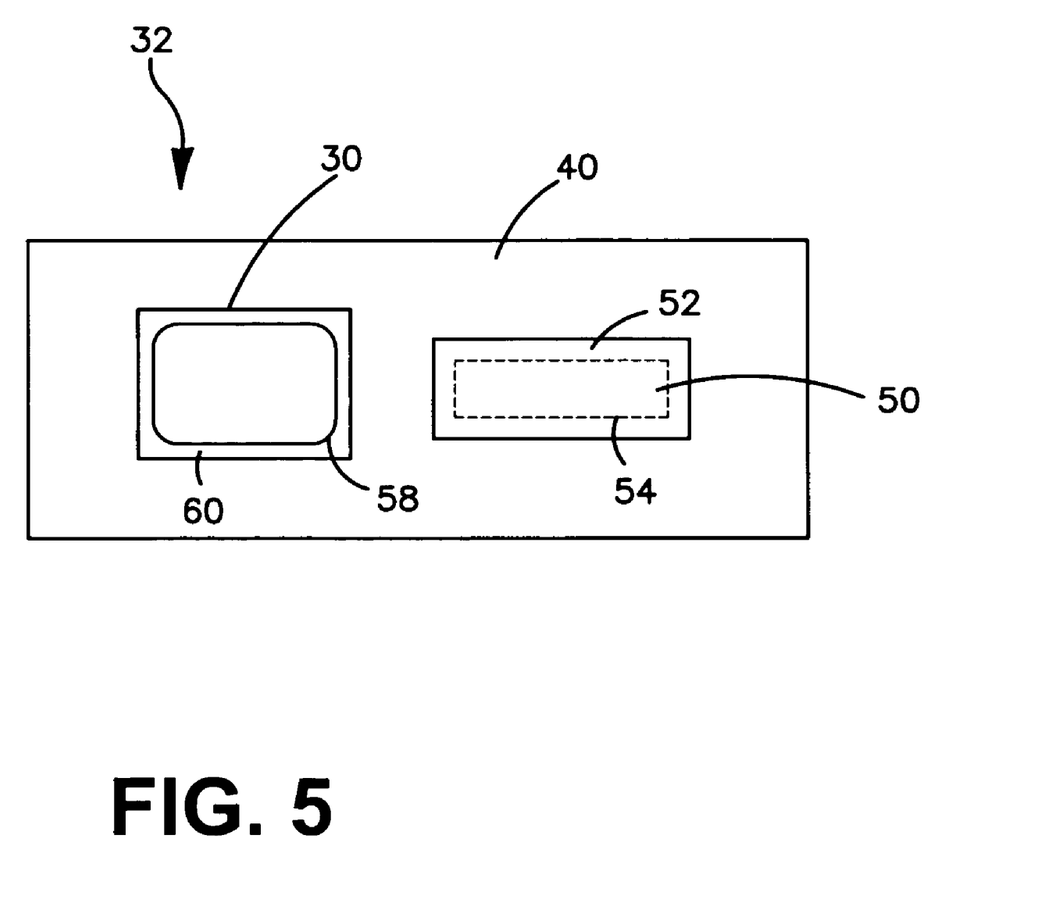
FIG. 5 is a front view of a scratch-and-sniff medium which, in one embodiment is the promotional material.
Figure 6:
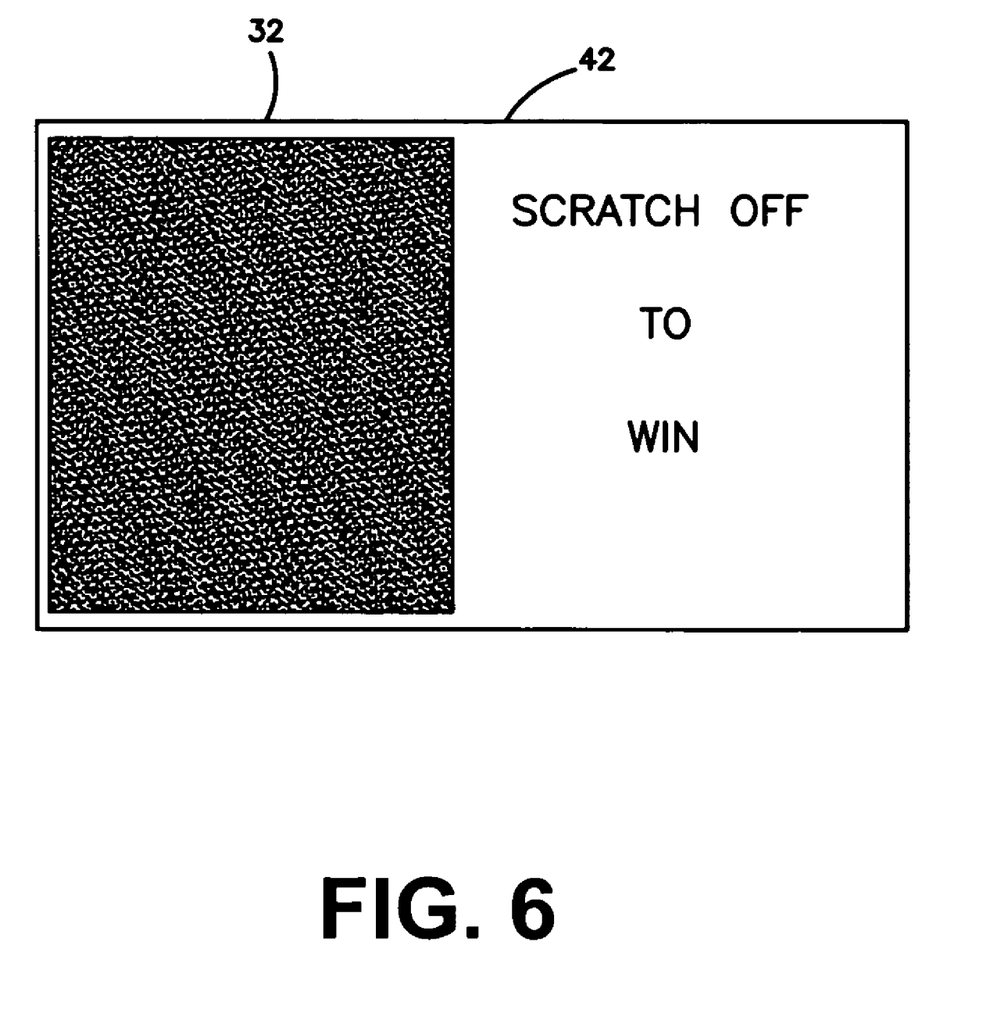
FIG. 6 is a front view of a scratch-off game piece.

Disposed on the planar surface 12 is a concealed promotional material assembly 30. The concealed promotional material assembly 30 includes the promotional material member 32 and the label member 34. The label member 34 covers the promotional material 32. The label member 34 has a front side 38 and an underside 36. A suitable adhesive may be applied to underside 36 so that when the label member 34 is covering the promotional material member 32, the label 34 will be affixed to the promotional material 32 thus concealing its nature. This gives the envelope the element of surprise when the label 34 is peeled back, as shown in FIG. 1, to reveal what the promotional material is. For example, as shown in FIG. 1, the promotional material 32 may be a money-off coupon for purchase of additional goods at a later time from the retailer's place of business. FIG. 5 shows an additional example where the promotional material 32 comprises a scratch-and-sniff area 40 for olfactory promotion of the retailer's store. Furthermore, the promotional material 32 could be a scratch-off game piece 42 as shown in FIG. 6.

FIG. 2 shows the reverse side 16 of the planar surface 12. An adhesive 44 substantially covers a portion of the second side 16 of the envelope 12. The adhesive surface 44 superimposed on the second side 16 is to insure that the envelope 10 can be affixed to an object, such as a box or a book. In certain embodiments, a backing strip 46 of release paper is provided to cover the adhesive prior to the envelope 12 being affixed to an object. The backing strip 46 is peeled away from the superimposed adhesive 44 when the user is ready for the envelope 12 to be secured to a package.

Figure 4:
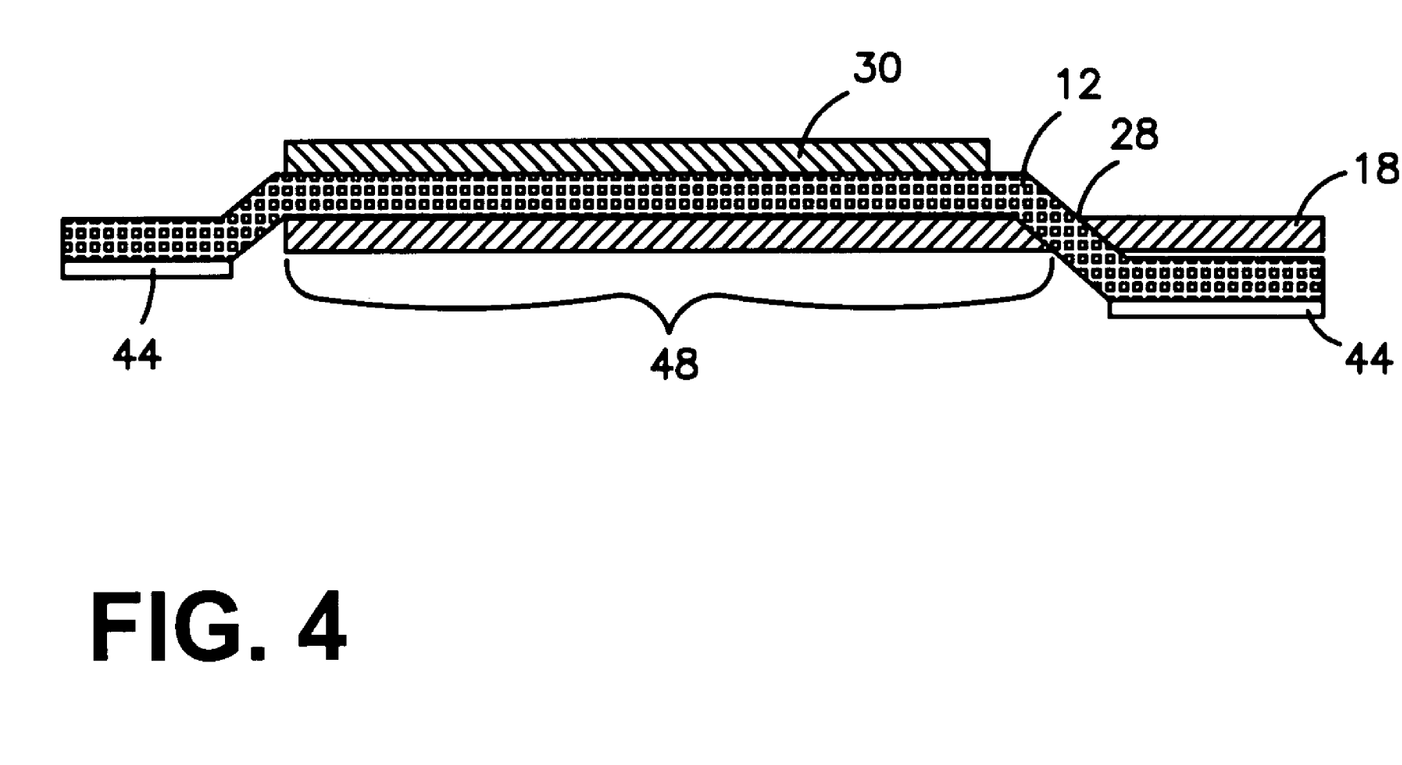
FIG. 4 is a section view of the envelope along section line 4-4 of FIG. 3 showing a transaction card inserted into the slot.

FIG. 4 is a sectional view of the present invention. When the planar surface 12 is affixed to an object by adhesive 44, pocket 48 is formed. The pocket 48 is designed to retain a transaction card such as transaction card 18. The transaction card 18 can be inserted into slot 28 and held in place by the pocket 48 formed between the planar surface 12 and the object the planar surface is affixed to. The slot 28 and the pocket 48 are sized such that when the transaction card 18 is inserted, it is removably secured inside the envelope so that the transaction card is not likely to fall out unless it is pulled out.

Alternatively, the user may choose to insert the transaction card into the pocket 48 then affix the envelope 10 to an object.

Turning next to FIG. 5, we see that the promotional material 32 may be a scratch-and-sniff surface. Typically a scratch-and-sniff surface, such as the one shown in FIG. 5, has a scent area 50 which contains the scent and/or taste of a food item. The scent area 14 includes a scratch-and-sniff coating technology to preserve the freshness of the scent area 14.

In the embodiment shown in FIG. 5, the scratch-and-sniff surface 40 is preferably manufactured using porous paper substrates or other materials used for "scratch-and-sniff" substrates that are adapted to be adhered to the planar surface 12 by a nontoxic and odorless adhesive.

The scratch-and-sniff surface 40 supports a patch or scent area 50 that is integrated into the scratch-and-sniff surface 40. In the embodiment shown in FIG. 5, the scent area 50 comprises an absorbent nontoxic material that has had a scent-producing element applied to it. The scent-producing element may be the ingredients found in food products sold at the retailer's store.

The scent area 50 may be covered by a protective coating 52 that can be scratched off or peeled off. The coating 52 may cover substantially three or four sides of perimeter 54 of the scent area 50. The coating 52 is employed to keep fresh the scent of scent area 50.

Additionally or alternatively, the scratch-and-sniff surface 40 also includes a distinctive symbol area 58 which includes one or more distinctive symbols or patterns having backgrounds 60 with distinctive patterns, colors or intensity contrasts. Different symbols can be deployed in distinctive symbol area 58 to provide visual recognition, clues or symbols associating with the scent in scent area 50.

FIG. 6 shows an alternative embodiment where promotional material 32 is a scratch and win type game 42.

This invention has been described herein in considerable detail in order to comply with the patent statutes and to provide those skilled in the art with the information needed to apply the novel principles and to construct and use embodiments of the examples as required. However, it is understood that the invention can be carried out by specifically different devices and that various modifications can be accomplished without departing from the scope of the invention itself.

What is claimed is:

1. An envelope for holding a transaction card comprising:
    a) a planar surface having a first side and a second side;
    b) a slot cut into said planar surface;
    c) an adhesive superimposed on said second side of the planar surface for adhesively affixing said planar surface to an object wherein when said planar surface is affixed to said object an interior space is defined between said second side of said planar surface and said object, said slot providing access to said interior space; and
    d) a concealed promotional material assembly coupled to a bottom half of the first side of the planar surface wherein the promotional material assembly comprises promotional material, a label concealing the promotional material and an adhesive removably securing the label in covering relation to the promotional material.

2. The envelope in claim 1 wherein the label comprises a single thickness opaque sheet having a front side and an underside.

3. The envelope in claim 2 wherein the front side has predetermined indicia on it.

4. The envelope in claim 3 wherein the predetermined indicia is a coupon.

5. The envelope in claim 4 wherein the coupon is a money-off coupon for use in purchasing additional products.

6. The envelope in claim 2 wherein the underside has predetermined indicia printed upon it.

7. The envelope in claim 6 wherein the predetermined indicia is a coupon.

8. The envelope in claim 7 wherein the coupon is a money-off coupon for use in purchasing additional products.

9. The envelope in claim 1 wherein the promotional material assembly is a scratch-off game piece.

10. The envelope in claim 1 wherein the promotional material assembly is a scratch-and-sniff sheet.

11. The envelope in claim 1 wherein the promotional material assembly is a coupon.

12. The envelope in claim 11 wherein the coupon is a money-off coupon for use in purchasing additional products.

13. An envelope for holding a credit/debit card comprising:
   a) a planar surface having a first side and a second side;
   b) a slit disposed on the first side of the planar surface for receiving the credit/debit card therethrough;
   c) an adhesive superimposed on the second side of the planar surface to adhesively affix said planar surface to an object wherein when said planar surface is affixed to said object an interior space is defined between said second side of said planar surface and said object, said slot providing access to said interior space; and
   d) a flap assembly coupled to the first side of the planar surface, said flap assembly comprising a single thickness opaque sheet having a hinge end and a free end, wherein the hinge end is pivotably coupled to the planar surface and promotional material disposed on the planar surface and adapted to be covered by the opaque sheet.

14. The envelope in claim 13 wherein the opaque sheet has predetermined indicia on a front surface.

15. The envelope in claim 13 wherein the opaque sheet has predetermined indicia on an underside surface thereof 16. The envelope in claim 14 wherein the predetermined indicia is a coupon.

17. The envelope in claim 15 wherein the predetermined indicia is a coupon.

18. The envelope in claim 13 where the promotional material is a coupon.

19. The envelope in claim 18 wherein the coupon is a money-off coupon for use in purchasing additional products.

20. The envelope in claim 13 wherein the promotional material is a scratch-off game.

21. The envelope in claim 13 wherein the promotional material is a scratch-and-sniff sheet.

22. An envelope for holding a transaction card comprising:
   a) a planar surface having a first side and a second side;
   b) a slot cut into the planar surface;
   c) an adhesive superimposed on the second side of the planar surface adhesively affixing said envelope to an object, wherein a pocket is defined between the planar surface and the object, said pocket in communication with said slit; and
   d) a concealed promotional material assembly coupled to the first side of the planar surface, said concealed promotional assembly comprising promotional material and a label concealing the promotional material wherein the promotional material is disposed between the label and the planar surface, and an adhesive removably securing the label to the planar surface.

23. The envelope in claim 22 wherein the label is a single thickness opaque sheet with a front side and an under side.

24. The envelope in claim 23 wherein the front side has predetermined indicia printed thereon.

25. The envelope in claim 24 wherein the predetermined indicia is a coupon.

26. The envelope in claim 25 wherein the coupon is a money-off coupon for use in purchasing additional products.

27. The envelope in claim 23 wherein the underside has predetermined indicia printed thereon.

28. The envelope in claim 27 wherein the predetermined indicia is a coupon.

29. The envelope in claim 28 wherein the coupon is a money-off coupon for use in purchasing additional products.

30. The envelope in claim 22 wherein the promotional material assembly is a coupon.

31. The envelope in claim 30 wherein the promotional material assembly is a money-off coupon for use in purchasing additional products.

32. The envelope in claim 22 wherein the promotional material assembly is a scratch-off game.

33. The envelope in claim 22 wherein the promotional material assembly is a scratch-off game.

34. The envelope in claim 22 wherein the promotional material assembly is a scratch-and-sniff sheet.

35. The envelope in claim 22 wherein the transaction card is inserted into the pocket through the slot.

36. A method of affixing a gift card to an object such that the gift card is securely affixed to the object, said method comprising:
   a) configuring an envelope to comprise
      i) a first planar surface having a first side and a second side;
      ii) a slot cut into the planar surface;
      iii) an adhesive superimposed on the second side of the planar surface adhesively affixing said envelope to said object, wherein a pocket is defined between the planar surface and the object, said pocket in communication with said slot;
      iv) a concealed promotional material assembly coupled to the first side of the planar surface, wherein the concealed promotional material assembly comprises promotional material, a label concealing the promotional material wherein the promotional material is disposed between the label and the planar surface, and an adhesive securing the label to the planar surface;
   b) inserting said gift card into the pocket of said envelope; and
   c) affixing said adhesive layer to said object.

37. The method in claim 36 comprising the additional steps of
   a) configuring the second side to include a removable layer affixed to the second side; and
   b) removing the removable layer from said second side before affixing the envelope to an object.

38. The method in claim 36 wherein the label comprises a single thickness opaque sheet with a front side and an under side and variable indicia printed on at least one side of the label.

39. The method in claim 38 wherein the predetermined indicia comprises a coupon.

40. The method in claim 39 wherein the coupon is a money-off coupon for use in purchasing additional products.

41. The method in claim 36 wherein the promotional material assembly is a coupon.

42. The method in claim 41 wherein the coupon is a money-off coupon for use in purchasing additional products.

43. The method in claim 36 wherein the promotional material assembly is a scratch-off game.

44. The method in claim 36 wherein the promotional material assembly is a scratch-and-sniff sheet.

45. A method of giving a gift to a person wherein said gift includes a first present and a transaction card, said method comprising:
   a) providing an envelope, wherein said envelope comprises
      i) a planar surface having a first and second side;
      ii) a slot cut into the planar surface;
      iii) an adhesive superimposed on the second side of the planar surface to adhesively affix the envelope to said first present wherein when said planar surface is affixed to an object an interior space is defined between said second side of said planar surface and said object, said slot providing access to said interior space;

iv) a concealed promotional material assembly coupled to the front side of the planar surface, wherein the concealed promotional material assembly comprises promotional material, a label concealing the promotional material and an adhesive securing the label to the first side;

b) affixing the envelope to the first present;

c) inserting the transaction card into the slot; and d) delivering the first present with the transaction card to said person.

46. The method in claim 45, comprising the additional steps of a) configuring the envelope to include a removable layer affixed to the second side of the planar surface; and     b) removing the removable layer from said second side before affixing the envelope to an object.

47. The method in claim 45 wherein the promotional material assembly comprises a coupon.

48. The method in claim 47 wherein the coupon is a money-off coupon for use in purchasing additional products.

49. The method in claim 45 wherein the promotional material assembly is a scratch-off game.

50. The method in claim 45 wherein the promotional material assembly is a scratch and-sniff sheet.

51. The method in claim 45 wherein the label comprises a single opaque sheet having a front side and an underside and variable indicia printed on at least one side of the label.

52. The method in claim 51 wherein the predetermined indicia is a coupon.

53. The method in claim 52 wherein the coupon is a money-off coupon for use in purchasing additional goods.

54. An envelope for holding a credit/debit card comprising:

(a) a planar surface having a first side and a second side;

(b) a slot cut into said planar surface;

(c) an adhesive superimposed on said second side of the planar surface for adhesively affixing said planar surface to an object wherein when said planar surface is affixed to said object an interior space is defined between said second side of said planar surface and said object, said slot providing access to said interior space; and (d) a concealed scratch-off promotional material assembly coupled to a bottom half of said first side of said planar surface wherein said scratch-off promotional material assembly comprises promotional material, a label concealing said promotional material and an adhesive removably securing said label in covering relation to said promotional material assembly.

55. The envelope in claim 54 wherein said scratch-off promotional material assembly is a scratch-off game piece.

56. The envelope in claim 54 wherein said scratch-off promotional material assembly is a scratch-and-sniff sheet.

57. The envelope in claim 54 wherein the scratch-off promotional material assembly is a scratch-off coupon.

58. The envelope in claim 57 wherein the scratch-off coupon is a money-off coupon for use in purchasing additional products.

\* \* \* \* \*